July 25, 1939.  I. E. McCABE  2,167,155
AUTOMATIC LOAD CONTROL
Filed Aug. 5, 1936  3 Sheets-Sheet 1

INVENTOR
IRA E. McCABE
BY Langdon Moore
ATTORNEY

July 25, 1939.　　　　I. E. McCABE　　　　2,167,155
AUTOMATIC LOAD CONTROL
Filed Aug. 5, 1936　　　3 Sheets-Sheet 2
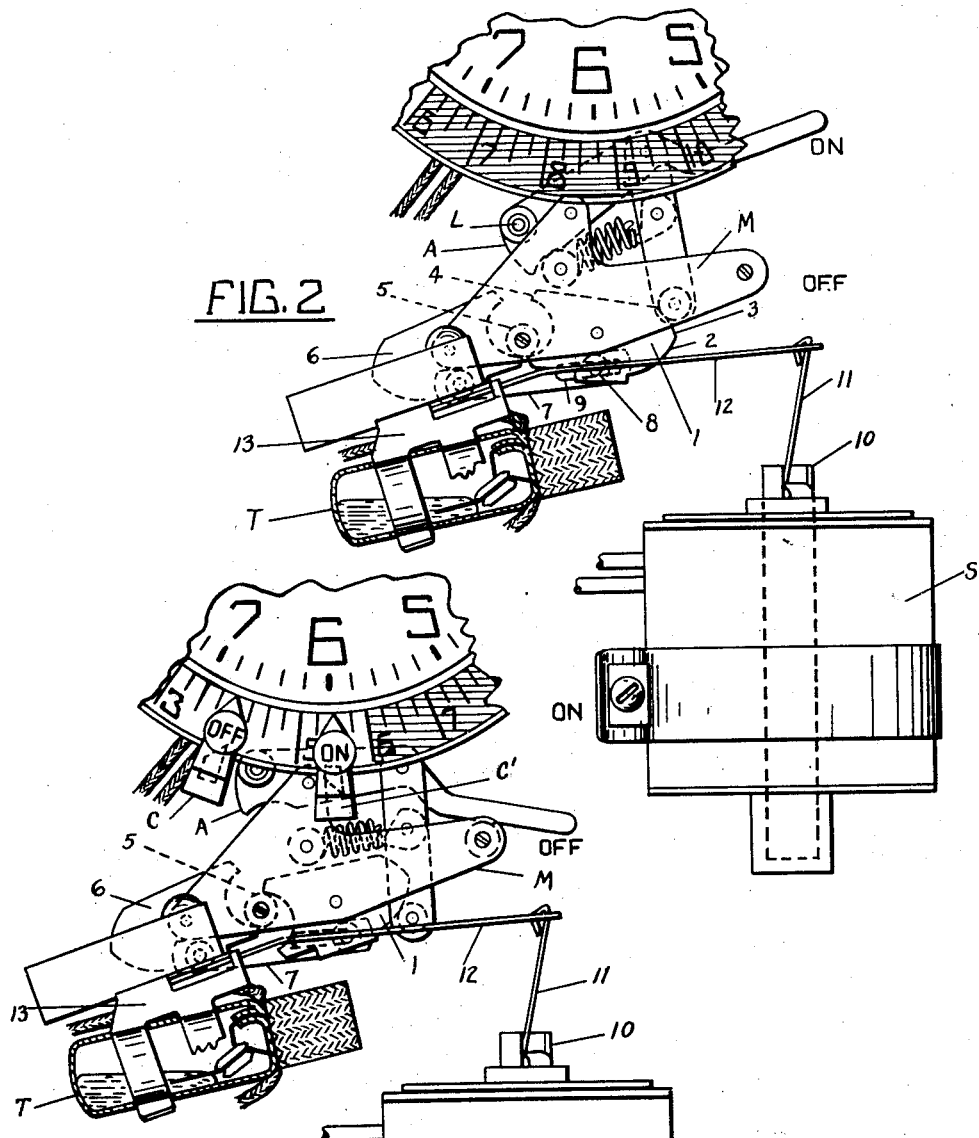
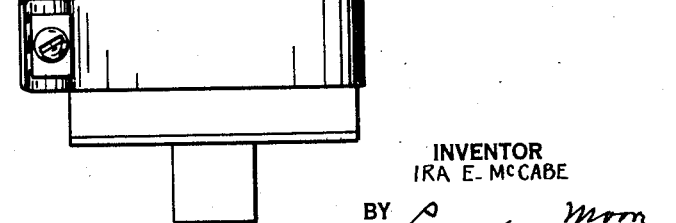
INVENTOR
IRA E. McCABE
ATTORNEY Patented July 25, 1939

2,167,155

UNITED STATES PATENT OFFICE 2,167,155

AUTOMATIC LOAD CONTROL

Ira E. McCabe, Chicago, Ill.

Application August 5, 1936, Serial No. 94,333

3 Claims. (Cl. 219—38)

This invention relates to an automatic control device and more particularly to a device of this character for automatically limiting the load upon a commercial electric service line for domestic purposes, such as used for operating electric ranges and water heaters in dwellings or buildings.

At the present time commercial program clocks have been installed in commercial circuits for cutting out an electric water heater during the peak hours of service without interfering with the operation of a domestic electric range connected with the commercial line, so that the user may have only periods of water heating during the power company's "off peak" load periods.

The use of such devices have made it possible for the power companies to grant special rates to customers employing them. However, the period for water heating as provided by the power company may be such that at certain times, as on wash-days, the hot water requirements would be difficult to maintain due to either short periods of heating or long periods of no heating.

It is an object of this invention to provide a device which will operate during the "off peak" period when both electric range and electric water heater may be normally employed which will automatically cut out the water heater during any period when the load of the range reaches a predetermined degree. Thus in addition to insuring sufficient hot water at all times the ability to obtain long periods for water heating would make possible the use of smaller tanks and consequently reduce the plant cost for the customer.

For instance, the program switch might be set to throw the current off to the electric water heater only during the hours of the system peak, as for example, from 4 P. M. to 6 P. M. At all other times, there would be no question of establishing distribution transformer peaks or overloading secondaries if the water heater were cut out whenever the range load exceeded a predetermined degree, as 1000 watts. The special "off peak" rate by the power company would be justified by the assurance that the water heater required no increase in plant investment. Load limiters are at present available for performing the duties as stated but they do not incorporate the "peak period" cut out feature necessitating the employment of separate devices when such a combination is desired.

With this and other objects in view, reference is made to the accompanying sheets of drawings which illustrate a preferred form of this invention.

Figure 2 is a fragmentary detail view illustrating the position assumed by the parts during the "off peak" period when the combined load of the electric range and electric water heater exceed a predetermined amount and the circuit to the water heater is broken through the mercury switch.

Figure 3 is a view similar to Figure 2, showing the position assumed by the parts when the circuit to the electric water heater is broken through the mercury switch during the peak period.

Figure 1:
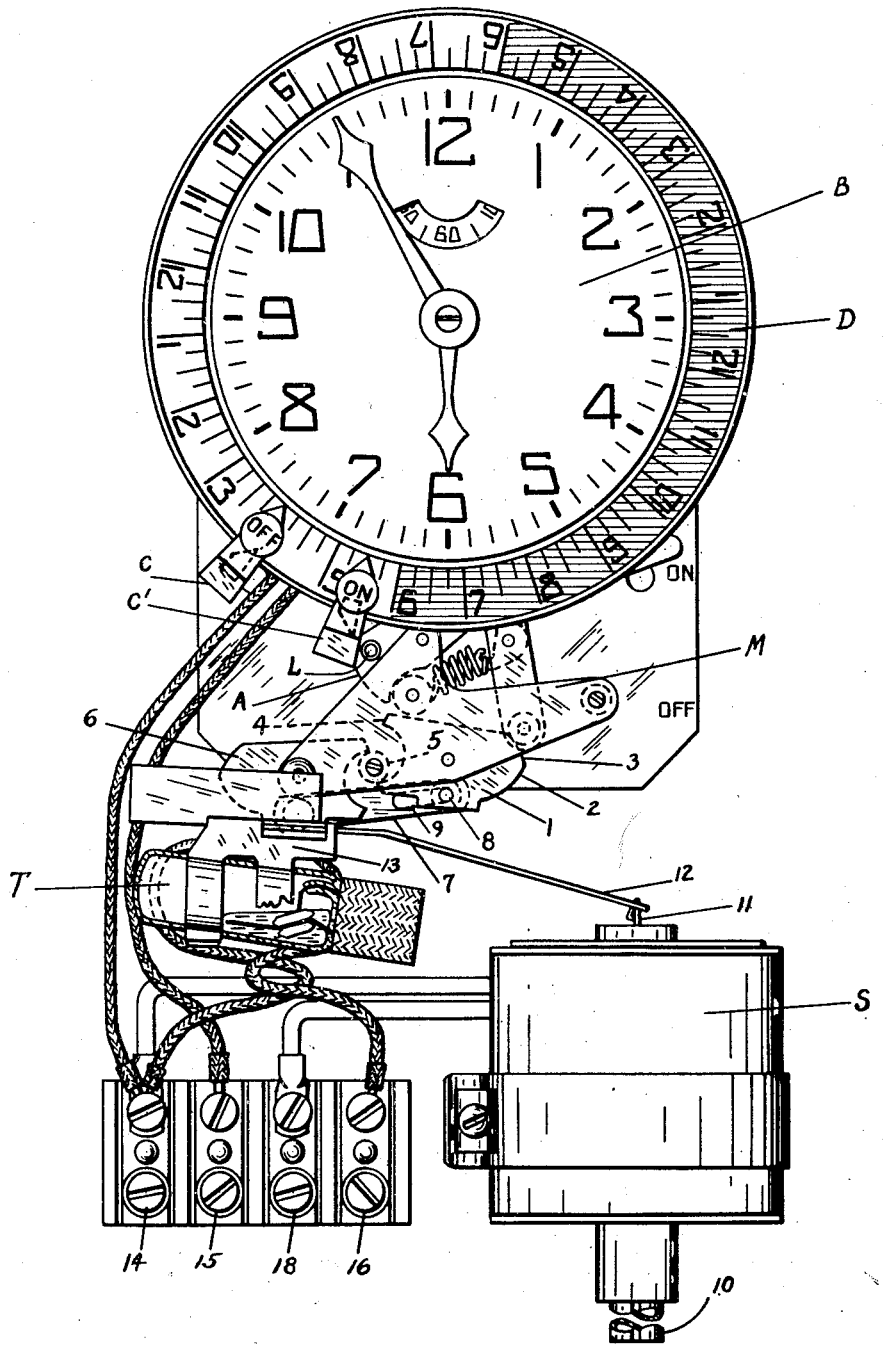
Figure 1 is a view in front elevation of a preferred form of this invention illustrating the position assumed by the control parts just following the termination of the peak hours with the electric water heater circuit closed through the mercury tube switch.

Figure 1 illustrates a program clock B of commercial construction including a rotating annular dial D having adjustable stops C and C' embracing the periphery of the dial D for determining the time during which the mercury tube switch T is opened or closed. The mercury tube switch T is carried upon a snap action mechanism M constructed in accordance with this applicant's prior Patent No. 1,734,016 of October 29, 1929, in which the actuating member A is provided with a lug L adapted to be engaged successively by the stops C and C'; whereby the stop C throws the switch to the open position and the stop C' throws the switch to the closed position.

The parts above described are all of commercial construction and are in commercial use at the present time.

In carrying out this invention, a solenoid S is employed and the snap action mechanism M is modified to the extent that the mercury tube switch carrying bar with the angular or sloping surfaces of the patent is divided, as shown in Figures 1 to 3, inclusive, to include a pivoted member 1 provided with the sloping surfaces 2 and 3 with rearwardly extending stops 4 on the side opposite the sloping surfaces adapted to engage a fixed stud 5 to limit the movement about its pivot. This member 1 is connected to a similar oppositely arranged and pivoted member 6 by a link 7 pivoted at one end to the member 6 and at the other end to the member 1 by a lost motion connection including a pin 8 upon the member 1 and a slot 9 in said link, whereby said link may slide over the pin 8. The core 10 of the solenoid 8 is connected by means of the jointed arms 11 and 12 to the mercury tube switch carrier 13 mounted upon the member 6. The arm 12 is rigidly connected to said carrier or member and the arm 11 is pivotally connected to the upper end of the core 10. When the solenoid is not energized sufficiently to actuate its core, the core will assume the position shown in Figure 1.

In Figure 1, the snap action M has been actuated by the clock to rotate the member 1 to the limit of its movement in the direction to close the mercury tube switch T and the weight of the core 10 rotates the member 6 to the limit of its movement to close the mercury tube switch T, so that the right hand end of the slot 9 in the link 7 is in engagement with the pin 8.

Should the solenoid be sufficiently energized to lift its core 10, it will impart through arms 11 and 12 a rotation in the opposite direction to the member 6 to open the mercury tube switch without interfering with the normal position of the member 1 through the lost motion connection in the link 7.

It is immaterial whether or not the solenoid core be in its uppermost position when the "peak" load is reached and the program clock actuates the snap mechanism to throw the mercury tube switch into the open position, as shown in Figure 3. When the member 1 is rotated to the limit of its movement in the opposite direction by the snap action from that illustrated in Figure 1, such movement is transmitted by the pin 8 in engaging the right hand end of the link 9 which in turn rotates the member 6 to the limit of its movement and in so doing throws the mercury tube switch to the open position as shown in Figure 3.

Figure 4:
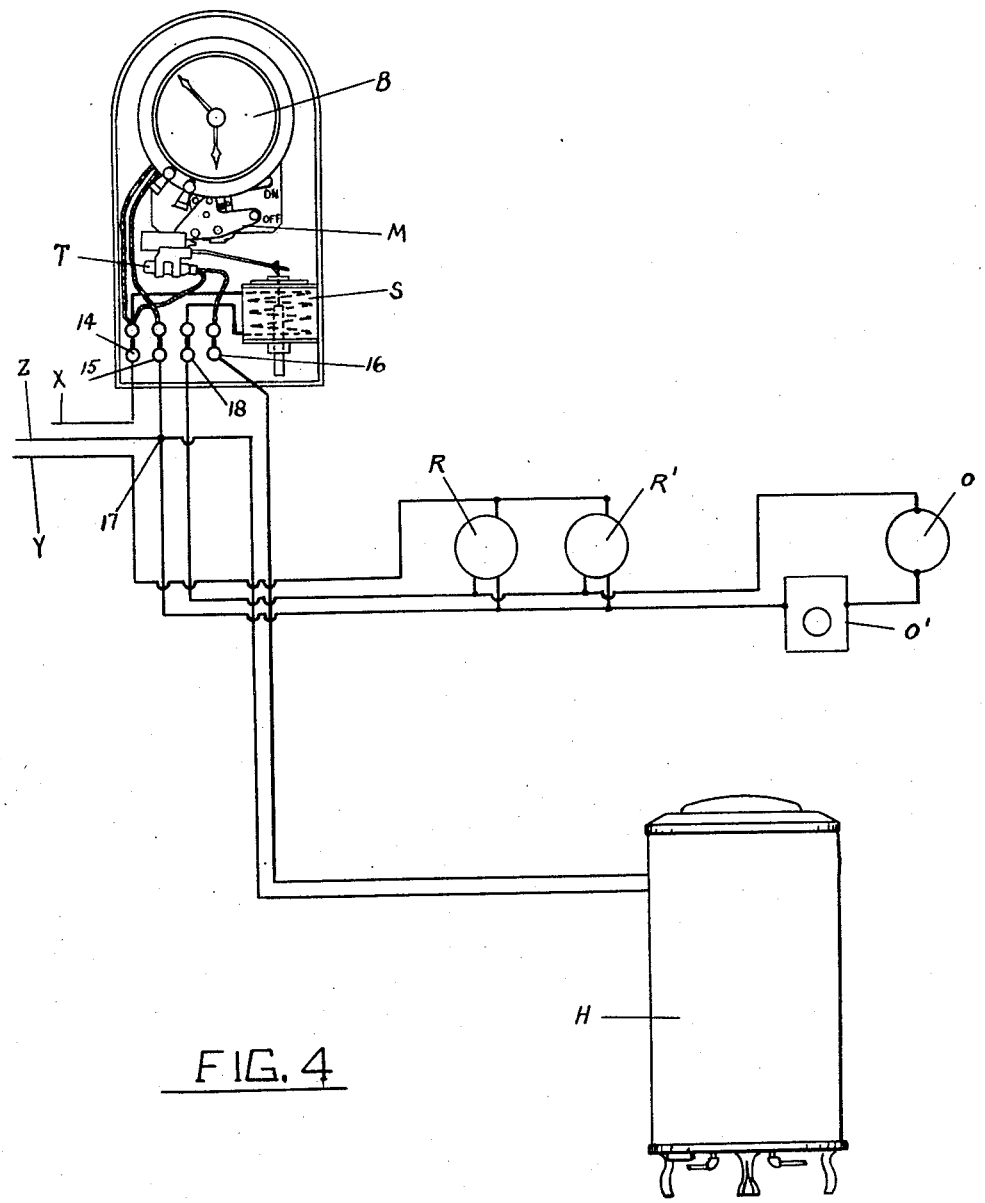
Figure 4 is a diagrammatical view illustrating this improved device, an electric range, an electric water heater, and a wiring diagram connecting the same to the commercial circuit.

Figure 4 illustrates the program clock B adapted to operate the mercury tube switch T through the snap movement M, the housing for said mechanism also supporting the solenoid S. The electric range is diagrammatically illustrated as including the surface heaters R and R' and the oven heater O and the oven temperature control O'. The electric water heater H as well as the range are of the usual commercial structure. The wiring diagram illustrates a commercial three-line system X, Y and Z, so that when the lines X and Z are connected through any of the instruments, a 115 volt circuit is completed, likewise when the lines Y and Z are connected through any of the instruments, a 230 volt circuit is completed.

The line X is connected to binding post 14 from which the current passes through the electric clock motor, not shown, to binding post 15 which, in turn is connected to line Z. The current from binding post 14 also passes through the mercury tube switch T to the binding post 16 and from thence through the electric water heater H to the binding post 17 connected to the line Z. The current from binding post 14 also passes through solenoid S, binding post 18 through the electric range to binding post 17 which is connected to line Z. The oven heater and oven temperature control are connected in series in this circuit, while the surface heaters R and R' are connected in multiple. The line Y is also connected through the individual surface heaters R, R' with the circuit through binding post 18, solenoid S, binding post 14 and line X.

As described above, during the "off peak" period, the electric heater is connected in circuit by the operation of the program clock closing the mercury tube switch T. At medium or low range heat the combined load of the electric range and electric water heater is generally below the maximum load allowed during "off peak" periods, but there are periods particularly during cooking operations that high heat is desired for the short periods which would increase the load to exceed the amount desirable for the "off peak" period. The solenoid S is so constructed that it will not be effectively energized to lift its core 10 to break the circuit through the mercury tube switch T until the load of the electric range reaches a predetermined degree, such as 1000 watts. When the load of the electric range effectively energizes the solenoid S, then the electric water heater is cut out temporarily, whereby the load upon the commercial line during the "off peak" period remains within the limits desired. As the maximum loads do not effectively energize the solenoid but for short periods at a time, the cutting out of the electric water heater for these short periods does not act as an inconvenience to the householder.

What I claim is:

1. In a system of electrical distribution for a plurality of electrical devices including an electrically heated water heater and a source of electrical energy supply, a control for limiting the operation of the electric heater to periods when the operation of any or all of the other devices does not exceed a maximum wattage including clock actuated means to render said control inoperative during predetermined hours to cut out the electric heater.

2. In a system of electrical distribution for a plurality of electrical devices including an electrically heated water heater connected in circuit to a source of electricity, a switch interposed in the circut from said water heater to said source, a mechanically operated switching mechanism therefor including a pivoted member of limited pivotal movement actuated by said mechanism, an additional pivoted member of limited pivotal movement carrying said switch, a link pivoted at its respective ends to said respective pivoted members having a lost motion connection with one of said members, whereby rotation of the first member to the limit of its travel in one direction opens said switch and in the opposite direction closes said switch, and a solenoid in circuit with the other said devices adapted to be effectively energized to move its core upon the load of the other devices reaching a predetermined wattage, a connection between the solenoid core and switch carrying member adapted upon effecti.e energization of the solenoid to rotate said switch carrying member to open said switch after it had been closed by said mechanism.

3. In a system of electrical distribution for a plurality of electrical devices including an electrically heated water heater connected in circuit to a source of electricity, a switch interposed in the circuit from said water heater and said source, a mechanically operated switching mechanism therefor including a pivotal member of limited pivotal movement actuated by said mechanism, an additional pivoted member of limited pivotal movement carrying said switch, a link pivoted at its respective ends to said respective pivoted members having a lost motion connection with one of said members, whereby rotation of the first member to the limit of its travel in one direction opens said switch and in the opposite direction closes said switch, and a solenoid in circuit with the other said devices adapted to be effectively energized to lift its core upon the load of the other devices reaching a predetermined wattage, a connection between the solenoid core and switch carrying member adapted upon effective energization of the solenoid to rotate said switch carrying member to open said switch after it had been closed by said mechanism, a program clock and means carried thereby to operate the switching mechanism at predetermined periods.

IRA E. McCABE.